United States Patent
Loesch et al.

(10) Patent No.: US 11,828,028 B1
(45) Date of Patent: Nov. 28, 2023

(54) METHOD FOR PROCESSING UP TO 100% RAP IN AN ASPHALT PLANT

(71) Applicant: Stansteel Corporation, Louisville, KY (US)

(72) Inventors: Leonard A. Loesch, Naples, FL (US); Steven W. Elam, Louisville, KY (US)

(73) Assignee: Stansteel Corporation, Louisville, KY (US)

( * ) Notice: Subject to any disclaimer, the term of this patent is extended or adjusted under 35 U.S.C. 154(b) by 1257 days.

(21) Appl. No.: 16/231,428

(22) Filed: Dec. 22, 2018

Related U.S. Application Data

(60) Provisional application No. 62/613,859, filed on Jan. 5, 2018.

(51) Int. Cl.

| | |
|---|---|
| *E01C 19/10* | (2006.01) |
| *B01D 46/62* | (2022.01) |
| *E01C 19/05* | (2006.01) |
| *B01D 50/60* | (2022.01) |
| *B01D 47/06* | (2006.01) |

(52) U.S. Cl.
CPC .......... *E01C 19/1036* (2013.01); *B01D 46/62* (2022.01); *B01D 47/06* (2013.01); *B01D 50/60* (2022.01); *E01C 19/05* (2013.01); *E01C 2019/109* (2013.01)

(58) Field of Classification Search
CPC ................ E01C 19/05; E01C 19/1036; E01C 2019/109; B01D 46/62; B01D 47/06; B01D 47/08; B01D 47/063; B01D 47/066; B01D 47/12; B01D 50/60; B01D 2273/20; B08B 15/00; G05D 23/022; Y10T 137/7737; F26B 11/028; F26B 11/04; F26B 11/0477

See application file for complete search history.

(56) References Cited

U.S. PATENT DOCUMENTS

| | | | | |
|---|---|---|---|---|
| 4,662,899 | A * | 5/1987 | Tandon | B01D 46/18 95/107 |
| 5,579,587 | A * | 12/1996 | Morrison | E01C 19/1036 34/135 |
| 6,478,461 | B1 * | 11/2002 | Frank | B01D 53/261 34/135 |
| 2007/0070801 | A1 * | 3/2007 | Musil | E01C 19/1036 366/25 |
| 2009/0020168 | A1 * | 1/2009 | Franconi | G05D 23/022 137/468 |

* cited by examiner

*Primary Examiner* — Gabriel E Gitman
(74) *Attorney, Agent, or Firm* — Duncan Galloway Greenwald PLLC; Kevin T. Duncan

(57) ABSTRACT

A method for producing asphalt using a high percentage of RAP (recycled asphalt pavement) in the total aggregate raw material. A counterflow rotary drum dryer is used to dry the raw material. The extent of the burner flame in the dryer is limited such that the RAP does not come into direct contact with the flame. The hot gases leaving the dryer pass to a wet scrubber.

20 Claims, 5 Drawing Sheets

METHOD FOR PROCESSING UP TO 100% RAP IN AN ASPHALT PLANT

BACKGROUND

The present invention relates to a method for processing up to 100% Reclaimed Asphalt Pavement (RAP) in the production of asphalt paving mixtures.

RAP is a useful alternative to virgin materials in the production of hot mix asphalt paving mixtures, because it reduces the need to use virgin aggregate and it reduces the amount of costly new liquid asphalt binder. It also eliminates the need to dispose of old asphalt pavement when removing old pavement and laying down new pavement, as the old pavement can be broken up and used as the raw material to make the new pavement. However, RAP contains volatile materials which are released under high temperatures. Some of these materials, such as hydrogen sulfide and other hydrocarbons, are highly flammable and may ignite when in contact with a flame. The undesirable effluent and the potential serious damage to the asphalt plant that would occur in the event of igniting off-gases have limited the percent of RAP that is used in the production of asphalt paving mixtures.

The industry standard for dealing with RAP has been to superheat virgin aggregate and then add and mix in the RAP to heat and dry the RAP. This method is not energy efficient and severely limits the percentage of RAP that can be used, since a large quantity of virgin aggregate must be heated and mixed together with the RAP in order to heat and dry the RAP.

SUMMARY

The present invention provides a method for using a much higher percentage of Reclaimed Asphalt Pavement (RAP), from 50% to 90% and even up to 100% RAP in the total aggregate being used. In the present invention, the RAP itself is heated and dried in a dryer as opposed to superheating a virgin aggregate in a dryer and then mixing the superheated virgin aggregate with the RAP to heat and dry the RAP. In a preferred embodiment, steps are taken in the design of the facility, the choice of the equipment used, and the operation of the equipment to drastically reduce the off-gases and the possibility of igniting off-gases in the plant. Furthermore, if a fire should occur in the rotary dryer, the material flow is such that the extent of the damage to the plant is extremely limited or completely eliminated.

Specifically, the flame from the burner in the rotary dryer is not allowed to go far enough upstream to come into contact with the RAP. Only hot air, heated by the flame of the burner, is allowed to proceed upstream into contact with the RAP being heated and dried in the dryer. The RAP (which travels in counter flow to the heated air from the burner) is picked up by veiling flights and is dropped and falls across the cross-section of the rotary dryer as the rotary dryer rotates, creating a veiled area. The veiling flights end at least two feet before the outlet opening through which the RAP exits the rotary dryer, creating a non-veiling zone upstream of the outlet and upstream of the end of the burner flame, so that the RAP never comes into contact with the burner flame.

As the heated air travels through the dryer, it picks up moisture from the RAP as well as volatile elements (mostly hydrocarbons) and some particulates. This effluent then exits the dryer and goes through a wet scrubber system which both removes most of the particulates from the effluent and cools the effluent so it may proceed to a coalescing filter to remove the hydrocarbon off-gases and some of the water before the effluent is exhausted from the plant.

In the unlikely event of a fire in the dryer, the wet scrubber would quench the fire so that no damage would be done to the filtration system. A fire damper system, such as a butterfly valve in the ductwork leading from the dryer to the wet scrubber, also may be incorporated to isolate any fire and further protect the filter collector and fume control system.

DESCRIPTION

Figure 1:
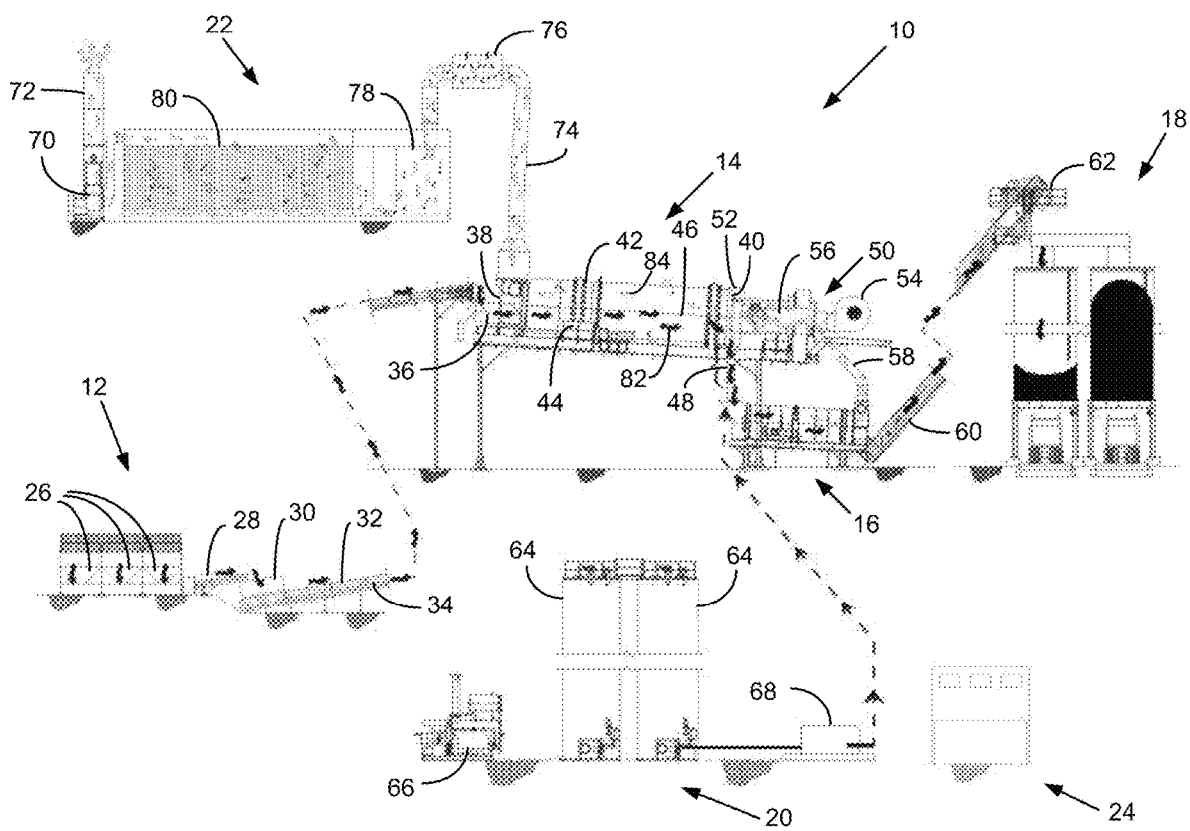
FIG. 1 is an overall equipment layout and flow diagram of a RAP (Recycled Asphaltic Product) facility in accordance with one embodiment of the present invention.
Figure 2:
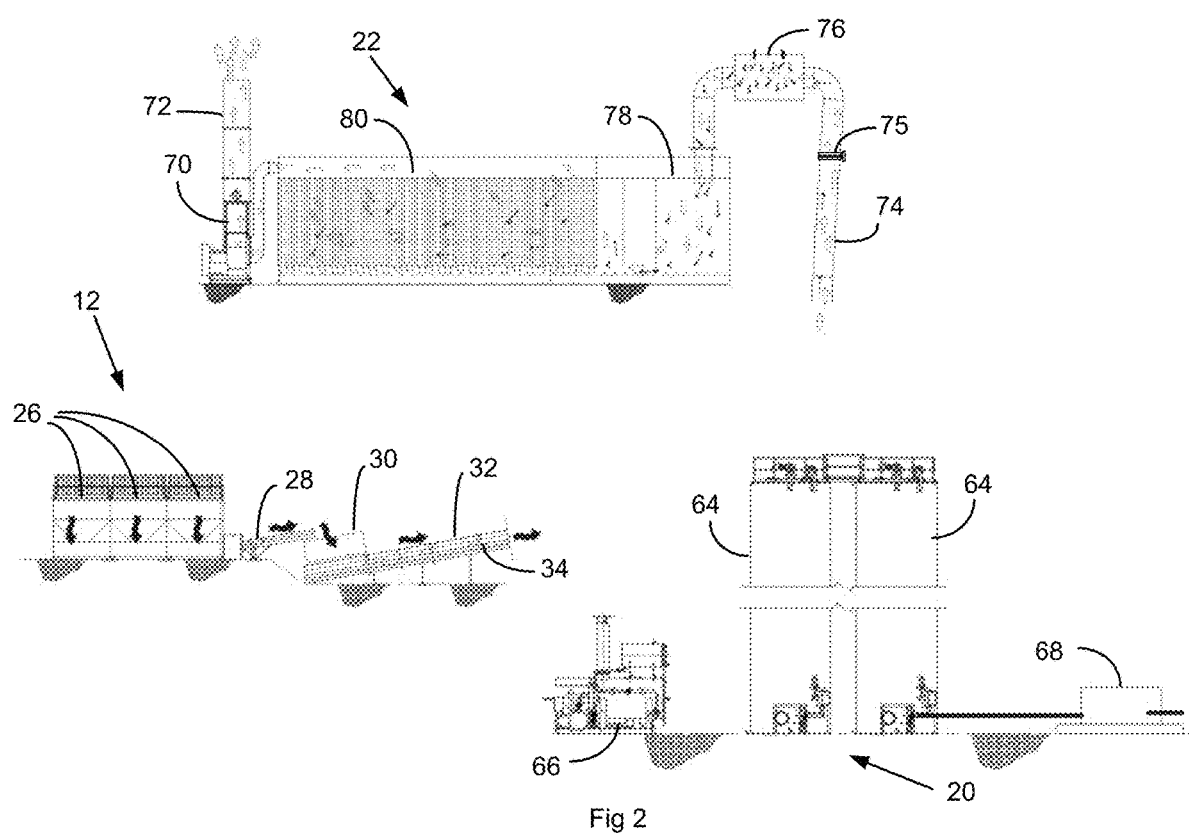
FIG. 2 is an enlarged view of some of the components (such as the recycled material feed bins, the filter collector and fume control system, and the liquid asphaltic cement and additives skid) shown in FIG. 1.
Figure 3:
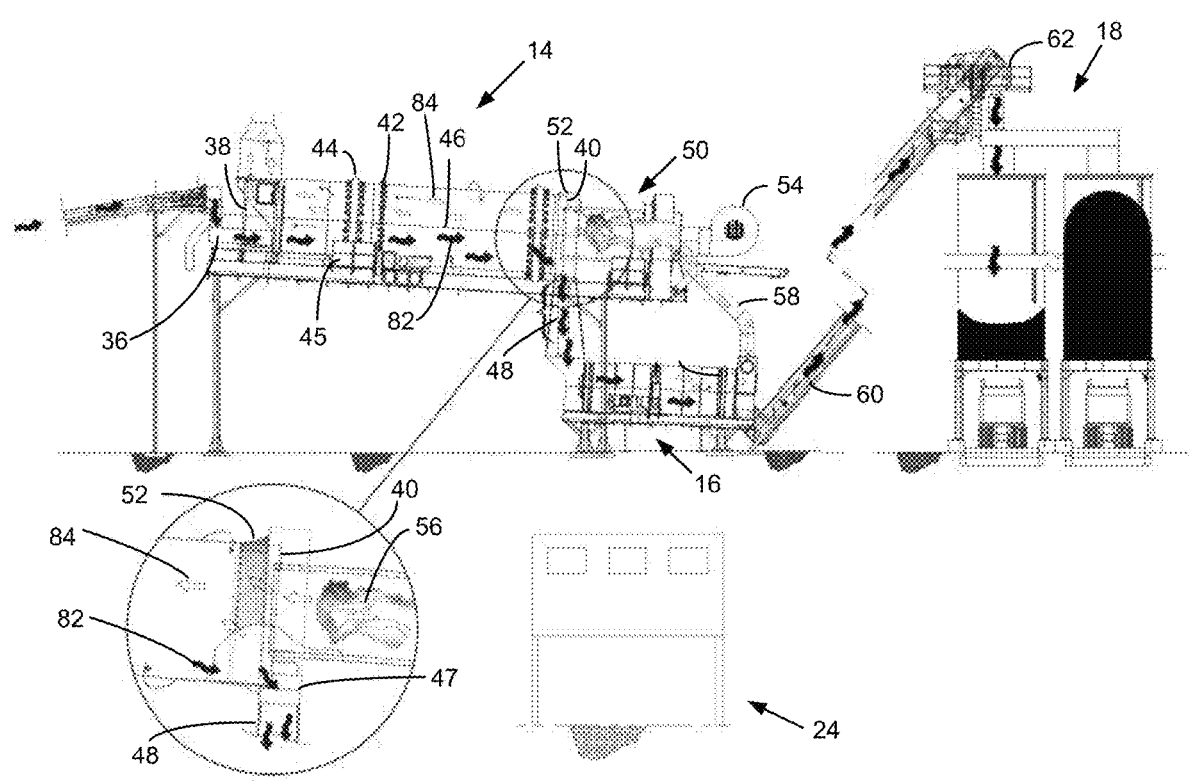
FIG. 3 is an enlarged view of the rest of the components (such as the counter flow rotary drum dryer which serves as a primary mixer, the secondary mixer (such as a rotary mixer or a pugmill), and the storage silos) shown in FIG. 1, including a detail view of the area where the rotating dryer meets up with the stationary burner/refractory chamber assembly (note: the control house is shown only in FIG. 1)

FIGS. 1-3 show a RAP (Recycled Asphalt Product) facility 10 in accordance with one embodiment of the present invention. This facility 10 includes an array 12 of raw material feed bins 26, a counterflow rotary dryer 14, which also serves as a primary mixer, a secondary rotary mixer 16, storage silos 18, a liquid asphalt cement and liquid additives skid 20, a filter collector and fume control skid 22, a control house 24, and materials handling and conveying equipment as needed, all of which are described in more detail below. It should be noted that a counterflow rotary dryer 14 is a rotary dryer in which the heated air that heats and dries the raw material flows in a direction that is opposite to the direction of flow of the raw material that is being heated and dried.

Referring to FIG. 2, the array 12 of feed bins 26 includes a plurality of bins 26, with each bin 26 preferably holding one of the raw materials used in the facility 10, such as one bin for coarser RAP material, one bin for finer RAP material, another bin for RAS (Recycled Asphalt Shingle) or other screened RAP size. If the plant is not using 100% RAP, there also would be one or more bins 26 for virgin aggregate. The raw material travels from the bins 26 to collecting conveyors 28, which feed a screen deck 30, such as a nominal 5'×12" double deck screen, with a deck selector so as to enable production of different grade mixes, such as a coarser base mix or a finer, intermediate or surface mix. The screen deck 30 feeds a transfer belt conveyor 32 with a belt scale or weigh bridge conveyor 34 which feeds a slinger belt 36 (See FIG. 3) at the inlet end 38 of the rotary dryer 14, so that the RAP enters the rotary dryer 14 at the inlet end 38.

Referring to FIG. 3, the counterflow rotary dryer 14 is mounted so that it tilts downwardly, with the inlet end 38 at a higher elevation than the outlet end 40. This rotary dryer 14 is driven to rotate about its longitudinal axis 46 in a normal manner, using a single wrap chain positive drive 42, tires 44, and trunnion rollers 45. The rotary dryer 14 also has appropriate internal flighting (as shown in FIG. 5 and discussed in more detail later).

Figure 5:
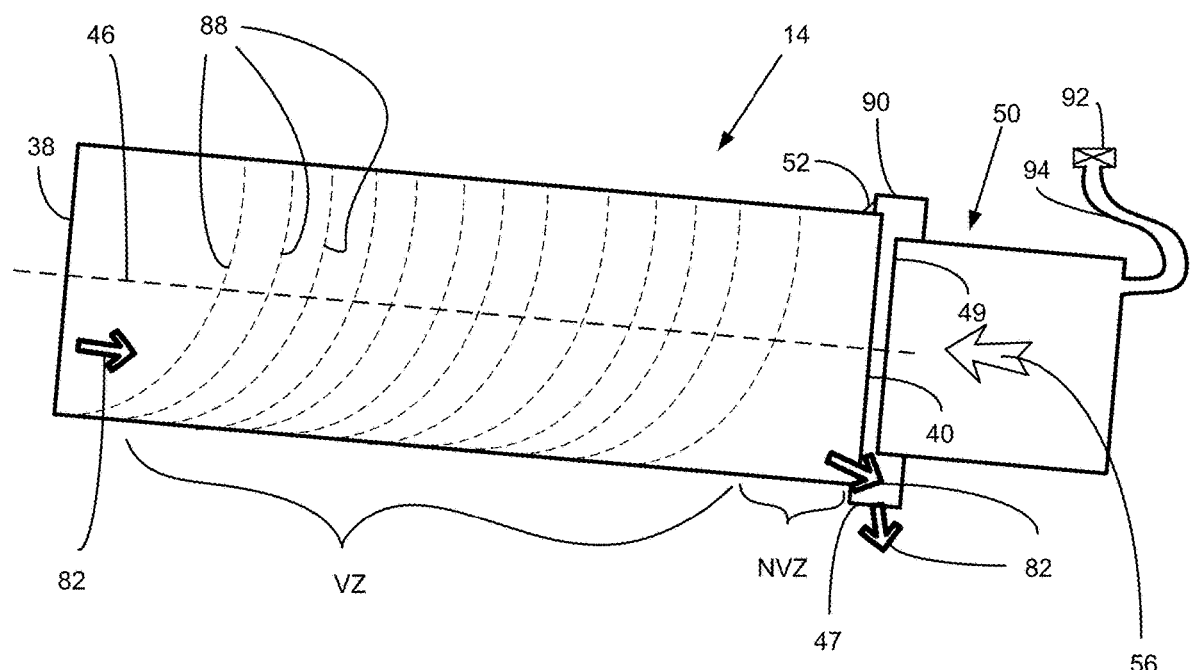
FIG. 5 is a schematic view of the rotary dryer and the combustion chamber, showing the veiling zone and the non-veiling zone in the rotary dryer.

Referring briefly to FIG. 5, the internal veiling flights 88 transfer the raw material in the axial direction of the dryer 14 from the inlet end 38 toward the outlet end as the dryer 14 rotates. (There may be some non-veiling flights for the first couple of feet at the inlet end to facilitate entry of material into the dryer 14 and prevent build up or back flow of raw material.) The veiling flights 88, shown schematically in FIG. 5, are staggered and expedite the raw material flow through the veiling zone (labeled VZ in FIG. 5). The veiling flights 88 also mix the raw material and facilitate heat transfer from the heated air to the raw material as the raw material travels in the axial direction of the dryer 14, from the inlet end 38 to the outlet end 40. The veiling flights 88 lift the raw material and drop it across the open central area of the dryer 14 (preferably across the longitudinal axis 46) as the dryer 14 rotates to create a veiling zone, where there is substantial surface contact between the raw material and the counterflowing hot air and substantial mixing of the raw material. The veiling flights 88 extend from adjacent the inlet end 38 of the dryer 14 toward the outlet end, but terminate at least two (2) feet short of the outlet end 40 of the dryer 14, and this extent of the veiling flights 88 defines the extent of the veiling zone VZ. Downstream of the veiling flights 88 and of the veiling zone VZ is a non-veiling zone (labeled NVZ in FIG. 5), where a different type of flight is used to keep the raw material close to the cylindrical wall of the rotary dryer 14 and transfer the raw material to the outlet end 40. This non-veiling zone NVZ is the portion of the rotary dryer 14 adjacent the outlet end 40, where the raw material is not lifted and dropped across the open central area of the rotary dryer 14. This non-veiling zone NVZ extends for at least the last two feet of the rotary dryer 14 upstream of the outlet 47, through which the raw material leaves the rotary dryer 14 at the outlet end 40 of the rotary dryer 14.

As was explained earlier, the rotary dryer 14 rotates about its longitudinal axis 46. This rotation works in conjunction with the veiling flights 88 inside the dryer 14 and with the downward tilt of the dryer 14 to lift the raw material (denoted by the thick, black arrows 82) and drop it, as if showering (or veiling) it over and through the flow of heated air flowing upstream from the burner 54, as denoted by the thick white arrows 84 shown in FIGS. 3 and 4. This showering or veiling of the raw material enhances the transfer of heat from the heated air to the raw material as the raw material is transported from the inlet end 38 to the outlet end 40 of the dryer 14. Note, however, as stated earlier, that the veiling of the raw material 82 stops at least two (2) feet short of the outlet 47 from the dryer 14.

Figure 4:
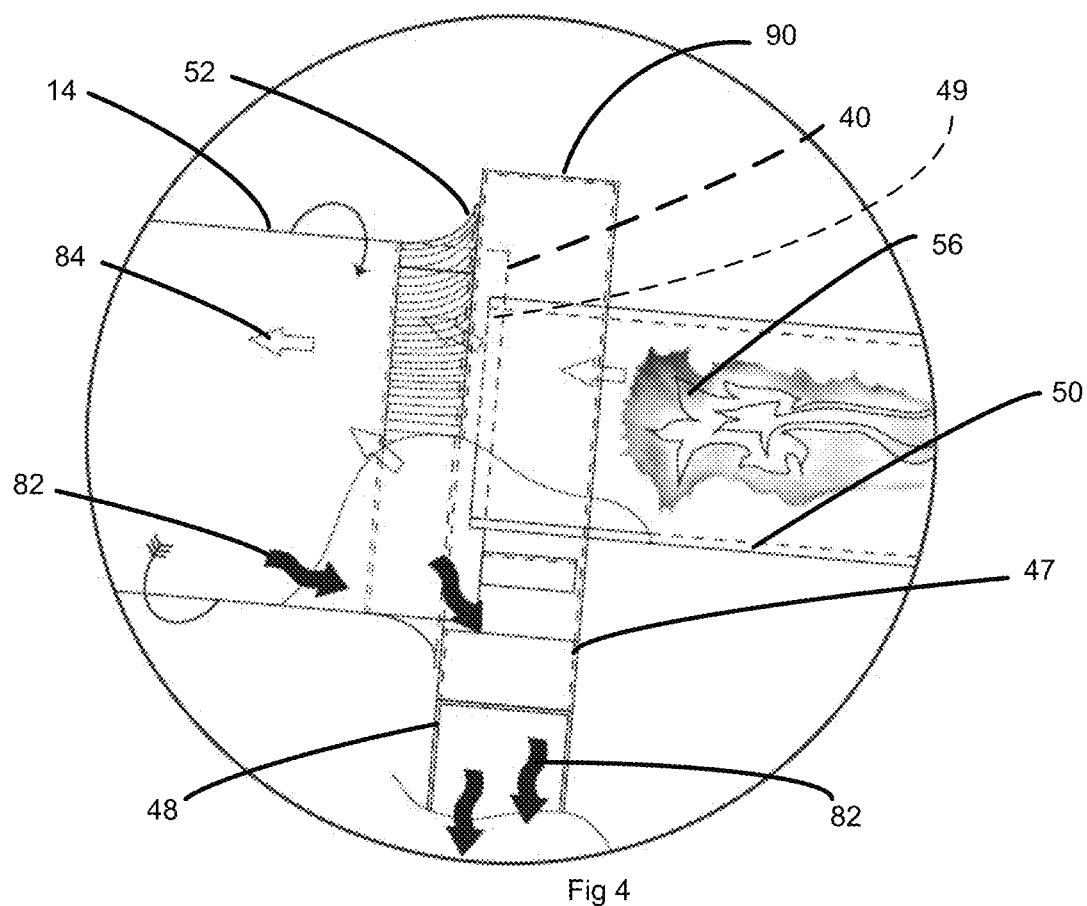
FIG. 4 is an enlarged view of the detail of FIG. 3.

As the raw material reaches the outlet 47 of the dryer 14, the dried and heated raw material flows out the outlet 47 and through a gravity discharge chute 48. Referring to FIGS. 3-5, it can be seen that the non-veiling flights in the non-veiling portion of the dryer 14 adjacent to the outlet 47 keep the raw material 82 adjacent to the cylindrical dryer wall and away from the axis 46, preventing the raw material 82 from entering the refractory chamber 50 which houses the burner flame 56.

The burner/refractory chamber assembly 50 is coupled to the outlet end 40 of the dryer 14, with the outlet of the refractory chamber 50 directed upstream, into the outlet end 40 of the rotary dryer 14. This burner/refractory chamber assembly 50 does not rotate. As is well-known in the art, a plurality of stainless steel plates 52 are mounted on and rotate with the rotary dryer drum 14 to form an air seal. As shown in FIG. 5, a non-rotating housing 90 couples the refractory chamber 50 to the rotating dryer 14, and the seal plates 52 limit the amount of air which is allowed to leak into the rotary dryer 14. As also shown in FIG. 5, a small fan or blower 92 is connected to the combustion chamber 50 via a duct 94 so that a controlled amount of bleed air (also referred to as quench air) is allowed into the combustion chamber 50 to control the temperature of the air in the dryer 14 and to control the amount of air flow through the dryer 14. It should be noted that both flue gases from the dryer 14 and vented gases from the secondary mixer 16 may be recirculated and fed back into the combustion chamber 50 via the fan 92.

As shown in FIG. 3, a baffle-type burner 54, such as a Beta burner, is provided to heat the incoming air to the desired temperature to heat and dry the raw material in the rotary dryer 14. The burner flame and air flow are controlled to heat the raw material to a temperature of approximately 300° F. as it exits the dryer 14 at the outlet 47. The flame 56 generated by the burner 54 is directed upstream toward the outlet end 40 of the rotary dryer 14. It should be noted that the burner 54 is controlled to ensure that the combustion flame 56 terminates before the outlet end 49 of the refractory chamber 50 (See FIGS. 4 and 5).

Referring now to FIG. 4, it can be seen that the raw material 82 leaves the dryer 14 at the outlet opening 47, located at the outlet end 40 of the dryer 14. In one embodiment, the refractory chamber 50 extends a short distance (less than six inches) into the outlet end 40 of the rotary dryer 14. Since there is a non-veiling zone NVZ for at least two feet upstream of the outlet end 40 and outlet opening 47, and since the burner is operated to limit the extent of upstream travel of the flame 56 so the flame stops short of the outlet end of the refractory chamber 50, the flame 56 does not come into contact with the raw material 82.

The bulk of the heated raw material 82 (with the exception of volatiles and dust particles which are carried away by the counterflowing air 84 to the filter collector and fume control skid 22, as described in more detail later) exits the dryer 14 at the outlet 47 to the gravity discharge chute 48 and is deposited into a secondary mixer 16. In this embodiment, the secondary mixer 16 is a rotary drum mixer, but it alternatively could be a pug mill or other mixer. Like the rotary dryer 14, which serves as a primary mixer, the secondary drum mixer 16 is mounted so that it tilts downwardly, with the inlet end being at a slightly higher elevation than the outlet end. This secondary mixer 16 has a single wrap chain, positive drive, and tires. Injection pipes (not shown) extend into the secondary mixer 16 for addition of liquid asphalt, rejuvenator, and other liquid additives into the secondary mixer 16. These additives are provided from the liquid asphalt cement and additives skid 20 (See FIG. 2), as described in more detail later. The liquid additives are selected for the desired type of asphaltic product, such as hot mix or cold mix asphaltic product. Solid additives may also be incorporated into this secondary drum mixer 16. It should be noted that volatiles and dust generated in the secondary mixer 16 are recirculated back to the burner/refractory chamber assembly 50 via fan and ductwork 58.

It should be noted that either the rotary dryer 14 or the secondary mixer 16, or both, may be provided with variable frequency drives (VFD's) in order to control and adjust their rotational speeds. By adjusting the rotational speed, it is possible to control the veiling and the residence time of the material for drying and mixing.

It also may be desirable to add prepared asphaltic product at the secondary mixer 16. For example, the asphalt plant 10 described herein may be a portable plant located near a road that is being torn up and rebuilt, so its raw feed would be the RAP from the local road that is being torn up, and prepared asphaltic product may be trucked to the portable plant 10 from a larger, stationary asphalt plant in the general area to be mixed with the heated, dried RAP in the secondary mixer 16. Of course, the asphalt plant 10 also may be installed next to a conventional asphalt plant.

The now heated and mixed asphaltic product exits the secondary mixer 16 and is conveyed by a slat conveyor 60 to one or more of a plurality of storage silos 18. The silos 18 may be equipped with sealed crossover bintop slat and batchers 62 to eliminate oxidation of the stored mix and to prevent the escape of blue smoke to the atmosphere. Referring to FIG. 2 and as mentioned earlier, the liquid asphalt cement and additives skid 20 provides additives for the production of specific mixes (such as hot asphalt mix or cold asphalt mix) as desired. In one embodiment, the liquid asphalt cement and additives skid 20 includes a plurality of 15,000 gallon capacity coiled tanks 64 (coiled for heating of the additives in the tanks 64 via a recirculated hot oil heater 66) for storing and metering, via one or more metering pumps 68, a plurality of liquid additives, such as liquid asphalt cement and liquid rejuvenators. The liquid asphalt cement and additives skid 20 is capable of metering the necessary quantity of liquid additives, such as liquid asphalt cement and liquid rejuvenator, to the heated raw material at the secondary mixer 16 via the injection pipes in the secondary mixer 16 mentioned earlier.

The filter collector and filtration system 22 includes a fan 70 which draws air (also referred to as effluent) which is laden with moisture, particulates, hydrocarbons, and non-condensables from the rotary dryer 14 through the air filtration system and ejects the cleaned air (containing mostly air, steam, and non-condensables) via the stack 72. The filtration system 22 has three (3) main stages. As the hot, dusty air is drawn from the rotary dryer 14, it is led, via a duct 74, to a wet scrubber 76. As discussed earlier, a fire damper system, such as a butterfly valve 75 in the ductwork 74 leading from the dryer 14 to the wet scrubber 76, may be provided to isolate any fire that may occur in the rotary dryer 14 in order to protect the filter collector and fume control system 22. This valve 75 may be pneumatically actuated or it may be spring loaded closed and held open via a thermal fuse which releases the valve 75 upon reaching a preset temperature, which would be reached in the event of a fire.

The wet scrubber 76 recirculates water from an internal reservoir and sprays the water over the effluent coming from the dryer 14. This acts as a cooler to cool the effluent to desired filtration temperatures, which further protects the two remaining filtration stages in the event of a fire in the dryer 14. The wet scrubber 76 also serves as a pre-cleaner to remove particulates from the effluent.

From the wet scrubber 76, the effluent is drawn to the primary collector area 78 which has a rolling filter (typically using a high temperature filtration medium such as Nomex™ (Nomex™ is a trademarked product made by the DuPont Company), which removes particulates that were not removed in the scrubber 76. The filter medium of the rolling filter is replaced as needed as it becomes particulate laden.

The effluent is then drawn to a coalescing filter 80, which includes a plurality of candlestick filters, which act to coalesce the oil particles in the effluent so they become larger particles (droplets) which drop out into a shallow pool at the bottom of the coalescing filter housing. This oily mix is removed as needed, is treated and then is disposed of. As mentioned above, the remaining effluent is then drawn into the fan 70 and ejected into the atmosphere via the stack 72.

The above described asphalt processing facility 10 may be fed up to 100% RAP for the production of asphalt paving mixtures. Despite the very high ratios of RAP used in this facility, which are greater than 50% of the total aggregate used, and preferably greater than 80% of the total aggregate used, and despite the volatility and flammability of material having such a high RAP ratio, the inherent design of the facility allows for a safe operation. As discussed above, the raw material 82 and its volatile gases are not allowed to come in contact with the flame 56, which prevents a fire in the dryer 14. Even in the unlikely event of a fire in the dryer 14, as the effluent gases are drawn out of the dryer 14 and into the filter collector and fume control skid 22, the gases first go through a wet scrubber 76 which quenches the fire before it can reach and damage the rest of the filter collector. The presence of the fire damper system, such as a butterfly valve 75 in the ductwork 74 leading from the dryer 14 to the wet scrubber 76, provides another layer of protection in the unlikely event of a fire.

While the embodiment described above shows one arrangement for a facility for production of asphalt paving mixtures, it will be obvious to those skilled in the art that modifications could be made to the arrangement described above without departing from the scope of the present invention as claimed.

What is claimed is:

1. A method for producing asphalt, comprising the steps of:

heating raw aggregate material in a counterflow drum dryer that rotates about a longitudinal axis, wherein the raw aggregate material is greater than 50% RAP by weight and flows through said counterflow drum dryer in a downstream direction, from an inlet end to an outlet end, with said heated raw aggregate material exiting said counterflow drum dryer through an outlet opening; wherein said counterflow drum dryer includes veiling flights from adjacent said inlet end toward said outlet end, wherein said veiling flights cause said raw aggregate material to be picked up and dropped as said counterflow drum dryer rotates, to create a veiling zone, and wherein said veiling flights terminate upstream of said outlet opening to define a non-veiling zone extending upstream of said outlet opening for at least two feet;

providing a combustion chamber and a burner, with said combustion chamber having an outlet end adjacent to the outlet end of the counterflow drum dryer, and said burner generating a flame directed in an upstream direction toward the outlet end of the counterflow drum dryer, and controlling the flame so that the flame terminates short of the outlet end of the combustion chamber and terminates short of the outlet end of the counterflow drum dryer and avoids contacting the raw aggregate material, wherein said burner generates a hot air stream flowing upstream through the counterflow drum dryer, said hot air stream picking up moisture, volatile gases and dust as the hot air stream flows through the counterflow drum dryer; said hot air stream then exiting the counterflow drum dryer and flowing to a wet scrubber which sprays water over the hot air stream, cooling the hot air stream and condensing volatile gases.

2. The method for producing asphalt as recited in claim 1, and further comprising the step of then passing said hot air stream to a rolling filter to separate out particulates.

3. The method for producing asphalt as recited in claim 2, and further comprising the step of then passing said hot air stream to a coalescing filter to coalesce additional condensed volatile gases remaining after the hot air stream exits the wet scrubber.

4. The method for producing asphalt as recited in claim 1, and further comprising the step of then passing said hot air stream to a coalescing filter to coalesce additional condensed volatile gases remaining after the hot air stream exits the wet scrubber.

5. The method for producing asphalt as recited in claim 3, wherein the raw aggregate material is at least 80% RAP by weight.

6. The method for producing asphalt as recited in claim 1, wherein said hot air stream is transferred from said counterflow drum dryer to said wet scrubber via a duct; wherein said duct incorporates a fire damper system between said counterflow drum dryer and said wet scrubber.

7. The method for producing asphalt as recited in claim 6, wherein said fire damper system includes a thermally actuated butterfly valve.

8. The method for producing asphalt as recited in claim 1, wherein
the raw aggregate material exiting the outlet end of the counterflow drum dryer is an intermediate product, and further comprising:
delivering the intermediate product to an inlet of a secondary mixing chamber;
introducing supplemental additives to the secondary mixing chamber and mixing the supplemental additives with the intermediate product received from the counterflow drum dryer; and
outputting a heated and mixed asphalt product.

9. The method for producing asphalt as recited in claim 1, comprising the further step of introducing a feed of raw aggregate material into the counterflow drum dryer from a bin array containing the raw aggregate material, wherein the bin array comprises a plurality of bins with each of the plurality of bins containing respective and segregated raw aggregate material components included in the raw aggregate material feed.

10. The method for producing asphalt as recited in claim 9, wherein the respective and segregated raw aggregate material components are segregated by: coarseness or grade; RAP material; virgin aggregate material; and recycled asphalt shingle (RAS) material, in any combination.

11. The method for producing asphalt as recited in claim 1, wherein said combustion chamber outlet extends partially into said counterflow drum dryer but does not extend beyond the non-veiling zone.

12. An asphalt production plant for producing asphalt from Reclaimed Asphalt Pavement (RAP), the asphalt production plant comprising:
a bin array storing raw aggregate material and comprising at least one bin storing RAP material;
a conveyer for transporting the raw aggregate material including RAP material;
a Counterflow Drum Dryer (CDD) having an inlet end adapted to receive aggregate material greater than 50% RAP by weight from the conveyor, the CDD further comprising an outlet end defining an outlet opening adapted to discharge treated aggregate material from the CDD, the CDD further comprising a set of veiling flights disposed from adjacent said inlet end toward the CDD outlet end;
wherein the CDD rotates about a longitudinal axis and causes the raw aggregate material to flow through the CDD in a downstream direction, from the inlet end to the outlet end of the CDD;
wherein the set of veiling flights define a veiling zone in which the raw aggregate material is picked up and dropped as the CDD rotates, and wherein the set of veiling flights terminate upstream of the CDD outlet opening to define a non-veiling zone extending upstream of the CDD outlet opening for at least two feet;
a combustion chamber (CC) having a combustion chamber outlet end operatively coupled with the CDD outlet end;
a burner configured to generate a flame, project the flame in the combustion chamber, and project the flame in an upstream direction toward the CDD outlet end, the burner and combustion chamber being configured so that the generated and projected flame terminates short of both the CC outlet end and the CDD outlet end to ensure the flame does not directly contact raw aggregate material in the counterflow drum dryer;
wherein the burner generates a hot air stream exiting the combustion chamber and flowing upstream through the counterflow drum dryer and heating the raw aggregate material as it travels downstream and exits the counterflow drum dryer through the CDD outlet opening;
wherein, the hot air stream picks up moisture, volatile gases and dust as the hot air stream flows through and exits the counterflow drum dryer; and
a wet scrubber configured to receive and spray water over the hot air stream exiting the counterflow drum dryer, thereby cooling the hot air stream and condensing volatile gases.

13. The asphalt production plant of claim 12, further comprising a coalescing filter to coalesce additional condensed volatile gases remaining after the hot air stream exits the wet scrubber.

14. The asphalt production plant of claim 12, further comprising a rolling filter to separate out particulates.

15. The asphalt production plant of claim 12, wherein the bin array comprises a plurality of bins, wherein each bin of the plurality of bins contains respective and segregated raw aggregate material components.

16. The asphalt production plant of claim 15, wherein the respective and segregated raw aggregate material components are segregated: coarseness or grade; RAP material; virgin aggregate material; and recycled asphalt shingle (RAS) material, in any combination.

17. The asphalt production plant of claim 12, wherein the combustion chamber outlet end extends partially into the counterflow drum dryer.

18. The asphalt production plant of claim 12, wherein the raw aggregate material is at least 80% RAP by weight.

19. The asphalt production plant of claim 12, wherein the hot air stream is transferred from the counterflow drum dryer to the wet scrubber via a duct; and wherein said duct incorporates a thermally-actuated fire damper disposed between said counterflow drum dryer and said wet scrubber.

20. The asphalt production plant of claim 12, wherein the raw aggregate material exiting the outlet end of the counterflow drum dryer is an intermediate product, and further comprising a secondary mixer, wherein the secondary mixer comprises:
- a first inlet for receiving the intermediate product from the counterflow drum dryer;
- a second inlet for receiving supplemental additives to the secondary mixer;
- a mixing apparatus configured to mix the supplemental additives with the intermediate product received from the counterflow drum dryer; and
- an outlet configured to output a finished final product which has been heated, dried and mixed.

* * * * *